(12) United States Patent
Wetzel (10) Patent No.: US 9,787,163 B2
(45) Date of Patent: Oct. 10, 2017

(54) ROTOR OF AN ELECTRICAL MACHINE AND ELECTRICAL MACHINE

(71) Applicant: SIEMENS AKTIENGESELLSCHAFT, München (DE)

(72) Inventor: Wolfgang Wetzel, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 123 days.

(21) Appl. No.: 14/424,786

(22) PCT Filed: Jul. 24, 2013

(86) PCT No.: PCT/EP2013/065612
§ 371 (c)(1),
(2) Date: Feb. 27, 2015

(87) PCT Pub. No.: WO2014/032868
PCT Pub. Date: Mar. 6, 2014

(65) Prior Publication Data
US 2015/0263590 A1    Sep. 17, 2015

(30) Foreign Application Priority Data

Aug. 31, 2012  (DE) .............................. 102012215503

(51) Int. Cl.
*H02K 1/32* (2006.01)
*H02K 9/04* (2006.01)
*H02K 1/27* (2006.01)
*H02K 9/06* (2006.01)

(52) U.S. Cl.
CPC ................ *H02K 9/04* (2013.01); *H02K 1/276* (2013.01); *H02K 1/32* (2013.01); *H02K 9/06* (2013.01)

(58) Field of Classification Search
CPC ............. H02K 1/276; H02K 1/32; H02K 9/06
USPC ........ 310/52, 54, 58, 64, 62, 60 A, 60 R, 61
See application file for complete search history.

(56) References Cited

U.S. PATENT DOCUMENTS 5,124,600 A * 6/1992 Hedeen .................... H02K 9/06
310/51
5,594,288 A * 1/1997 Husain .................... F01D 5/028
310/62
6,509,660 B1 * 1/2003 Asao ..................... F04D 29/282
310/263

(Continued)

FOREIGN PATENT DOCUMENTS

CN        1777756 A      5/2006
CN     101171736 A      4/2008
(Continued)

*Primary Examiner* — Hanh Nguyen
(74) *Attorney, Agent, or Firm* — Henry M. Feiereisen LLC (57) ABSTRACT

A rotor (2) of an electrical machine (60) has a laminated rotor core (4). A fan (18), which is arranged at the end face in the laminated rotor core (4) is provided for cooling purposes. The fan has a fan blade (21) and a supporting element (20) for the fan blade (21), wherein the fan blade (21) extends by way of a first section (31) beyond the supporting element (20) in a first axial direction and extends by way of a second section (33) beyond the supporting element (20) in a second axial direction (34) which is opposite the first axial direction (32).

6 Claims, 5 Drawing Sheets

(56) References Cited

U.S. PATENT DOCUMENTS

| | | | | |
|---|---|---|---|---|
| 7,345,383 B2 * | 3/2008 | Zushi | ............... | H03K 17/0822 307/130 |
| 2005/0134126 A1 * | 6/2005 | Ibach | ............... | F04D 25/0606 310/62 |
| 2006/0261688 A1 * | 11/2006 | Akita | ............... | H02K 9/06 310/63 |
| 2008/0193275 A1 | 8/2008 | De Filippis | | |

FOREIGN PATENT DOCUMENTS

| | | |
|---|---|---|
| CN | 101617128 A | 12/2009 |
| CN | 102192188 A | 9/2011 |
| CN | 104604099 A | 5/2015 |
| DE | 197 11 750 A1 | 10/1998 |
| DE | 10 2012 215 236 A1 | 3/2014 |
| DE | 10 2012 215 241 A1 | 3/2014 |
| EP | 1722462 A1 | 11/2006 |
| JP | 2001-061257 A | 3/2001 |
| SU | 17 37 632 A1 | 5/1992 |
| WO | WO 2012057523 A2 | 5/2012 |

\* cited by examiner

ROTOR OF AN ELECTRICAL MACHINE AND ELECTRICAL MACHINE

CROSS-REFERENCES TO RELATED APPLICATIONS

This application is the U.S. National Stage of International Application No. PCT/EP2013/065612, filed Jul. 24, 2013, which designated the United States and has been published as International Publication No. WO 2014/032868 and which claims the priority of German Patent Application, Serial No. 102012215503.1, filed Aug. 31, 2012, pursuant to 35 U.S.C. 119(a)-(d).

BACKGROUND OF THE INVENTION

The present invention relates to a rotor of an electrical machine.

The rotor may have a laminated rotor core which is connected to a rotor shaft of the rotor in a torque-proof manner, wherein the laminated rotor core extends from a first axial end face of the laminated rotor core to a second axial end face of the laminated rotor core viewed in the direction of a rotational axis of the laminated rotor core.

Furthermore, the present invention relates to an electrical machine, the electrical machine having a stator and a rotor, the rotor being mounted in bearings so that it can be rotated around a rotational axis of the rotor.

SUMMARY OF THE INVENTION

An object of the invention is to form a rotor of an electrical machine with a fan the performance of which is improved.

The object is achieved by a rotor of an electrical machine, wherein the rotor has a laminated rotor core, wherein a fan is arranged at the end face in the laminated rotor core, wherein the fan has a fan blade and a supporting element for the fan blade, wherein the fan blade extends by way of a first section beyond the supporting element in a first axial direction, and wherein the fan blade extends by way of a second section beyond the supporting element in a second axial direction which is opposite the first axial direction. Advantageous embodiments of the rotor or a corresponding electrical machine are the subject matter of the dependent claims.

A rotor of an electrical machine has a laminated rotor core. A fan is arranged at the end face in the area of the laminated rotor core. The fan has a fan blade. The fan blade is located at and/or on a supporting element. This supporting element may be annular in design. The supporting element may therefore be an annular disk. A kind of fan support disk for one or a multiplicity of fan blades is thus formed. The multiplicity of fan blades on the supporting element can be symmetrically arranged in a circumferential direction.

The structure of a rotating fan is subjected, inter alia, to centrifugal forces. In particular, in fans made of thin sheet metal these centrifugal forces result in a bending moment at the fastening points of the fan blades on the fan support ring (supporting element) so that in certain circumstances permissible mechanical tensions may be exceeded in these areas during normal operation of the electrical machine, possibly resulting in component failure.

Various measures may be taken to improve the strength of welded fan blades. These include an improved embodiment of the welded seam, the choice of material, the choice of material thickness, the number and/or design of the fan blades, etc.

A fan blade and/or a multiplicity of fan blades can be arranged in such a way that it has a first section and a second section. Viewed from the supporting, element, the first section is located in a first axial direction and, viewed from the supporting element, the second section is located in a second axial direction. The axial directions relate to the rotational axis of the electrical machine and therefore the rotational axis of the rotor as well. The first axial direction is opposite the second axial direction. The rotor can be designed in such a way that the sections (first and second) extend axially beyond the supporting element.

The center of gravity of the mass of a fan blade is located axially between the axial end sections of the fan blade. If the center of gravity of the fan blade is not at the level of the support disk or close to this support disk (level), the centrifugal forces acting at the center of gravity of the blade can produce a moment at the fastening point on the supporting element which can lead to unreliably high mechanical tensions. Due to an often restricted mounting space outside the laminated rotor core, it is not easy to find measures to transfer the center of gravity to the level of the supporting element. A position of the center of gravity which is neutral in terms of the bending moment is advantageous.

Therefore, in order for the connection of the fan blade to the supporting element to be subjected to the least mechanical stresses possible during operation of the rotor, the center of mass (center of gravity) can be positioned as close to the supporting element as possible.

In one embodiment of the rotor, the mass of the first section and the mass of the second section is distributed in such a way that a center of mass which is located in the area of the supporting element is produced for the sections of a common blade, this relating to an axial area and/or a radial area. The supporting element is, for example, an annular disk which has fan blades in an external area.

The shape of the fan blades must therefore be influenced in such a way that the centrifugal force acting at the center of gravity results in reduced bending moment at the fastening point or none at all. A radial fan made of thin sheet metal can therefore also be used as a fan. The use of thin sheet metal permits e.g. favorable production, a low weight, good balancing.

In one embodiment of the rotor, the laminated rotor core has a recess at the end face. The laminated rotor core may also have a multiplicity of recesses at the end face, these advantageously having a rotationally symmetrical position. The recess may be a cooling channel which extends from one end face of the laminated rotor core to the other end face of the laminated rotor core. A part of the fan blade extends into the recess. This part is in particular the second section of the fan blade facing the end face of the laminated rotor core. Various advantages can be achieved in this way. If the second section extends into the recess of the laminated rotor core, the center of gravity of the fan blade can then also be shifted in the direction of the laminated rotor core if the supporting element is close to the end face of the laminated rotor core and the distance between the supporting element and the end face is small. If the second section of the fan blade extends into a cooling channel, heat can already be emitted on a heat-conducting fan blade in the cooling channel. In particular, the fan blade comprises iron as a material (in particular, it is made of thin sheet metal). If the supporting element is also made of a material comprising iron, this supporting element is also used for additional cooling. Therefore, in an embodiment of the rotor if the recess extends from a first axial end face to a second axial end face to form a cooling channel, wherein the rotor may comprise a multiplicity of these cooling channels, then it is possible to improve the cooling of the rotor by means of the heat-conducting elements extending into the cooling channels. The heat-conducting elements may be part of a fan blade.

Therefore, when there is only a restricted mounting space for the fan (e.g. due to collision with stationary components, balancing of the fan, installation, etc.), for a fastening which is neutral in terms of bending moment of the fan blades on the fan support ring it is advantageous to extend the lower front area of the fan blades into the cooling channels of the laminated rotor core. By this means, the center of gravity of the blades can be shifted at the level of the support disk to enable a fastening that is neutral in terms of bending moment. As a result of this, tensions in the component are reduced. Thanks to the blade design described, no negative effects on the feed effect or acoustics of the fan need be feared.

In one embodiment of the rotor the cross section of the cooling channel in the rotor is axially unchanged in the area in which the second section of the fan blade extends into the cooling channel. In particular, this is the case for simple geometric shapes which are easy to realize.

In one embodiment of the rotor, the supporting element is welded and/or bonded to the fan blade. This welding and/or adhesive bonding may involve both the first section of the fan blade as well as the second section of the fan blade. If the center of gravity of the fan blade is close to the supporting element, fewer stresses are produced by the connection between fan blade and supporting element. This may positively influence the durability of the connection (welded connection and/or adhesive bonding).

In one embodiment of the rotor the center of mass of the fan blade (or the fan blades) is located in a central area of the adhesive bonding or the welded connection, the connection having a radial arrangement. Strain on the connection can also be reduced in this way.

In one embodiment of the rotor, the fan blade is designed as sheet metal parts. The fan blade(s) can, for example, be attached to an annular disk in order to bond or weld the latter according to their positioning there. In one embodiment the fan blades are attached to the annular disk radially from the inside to the outside. This results in simplified mounting of the fan blades on the annular disk (supporting element).

In one embodiment of the rotor, the thickness of the fan blade is different outside and inside the recess. As a result of this degree of freedom to choose the thickness of the sections or of the fan blade, it is easy to vary the position of the center of gravity.

In one embodiment of the rotor the thickness of the second section is smaller than the thickness of the first section. As a result of this, the axial cross section of a cooling channel does not need to be unnecessarily reduced. To compensate for the reduced thickness, the part of the second section extending into the laminated rotor core can be longer in design.

In one embodiment of the rotor, the fan blade has a curved end portion, the end portion being located in a section of the extension of the second section into the recess. The curved end portion is therefore located in the cooling channel in particular. The flow in the cooling channel can be improved by the curvature. As a result of lower vorticity the cooling effect can be optimized and/or this is not negatively influenced by the material in the cooling channel.

In one embodiment of the invention a rotor of the described embodiments is incorporated into an electrical machine which has a stator assigned to the rotor, the electrical machine being a traction motor of a vehicle. Examples of vehicles are heavy goods vehicles, automobiles, streetcars, etc.

The fan of an electrical machine, in particular in a vehicle, can be permanently connected to the rotor of the electrical machine, wherein the laminated rotor core distributed around the rotational axis has further recesses which viewed in the direction of the rotational axis extend from the first axial end face to the second axial end face. A tension rod which, viewed in the direction of the rotational axis extends beyond the axial end faces, is inserted into each of the further recesses, for example. Fastening elements can be mounted on the tension rods at both axial end faces so that the rotor cores of the laminated rotor core are pressed against each other, being mounted on the tension rods of the fans at the first axial end face of the laminated rotor core.

If the laminated rotor core has a multiplicity of rotor cores, the rotor cores may each have a yoke on their side facing away from the rotational axis and a sheet metal hub on their side facing the rotational axis. In this case the yokes and the sheet metal hubs of the rotor cores are connected to each other via respective sheet metal spokes. Preferably the fastening elements are arranged between the end face and the fan at the first axial end face of the laminated rotor core. Preferably the fan has an annular disk orthogonal to the rotational axis and the fan blades protruding from the annular disk. The annular disk may have an outer ring on its side facing away from the rotational axis and a disk hub on its side facing the rotational axis. In this case the fan blades are arranged on the outer ring and the outer ring and the disk hub are connected to each other via disk spokes.

If the disk hub is mounted on the tension rod in one embodiment, it is possible that the disk hub is not connected to the rotor shaft in a torque-proof manner. In this case, the disk hub solely serves as a positioning and centering aid for the fan during installation.

BRIEF DESCRIPTION OF THE DRAWING

The invention is explained in more detail hereinafter with reference to figures. The figures show.

DETAILED DESCRIPTION OF PREFERRED EMBODIMENTS

Figure 1:
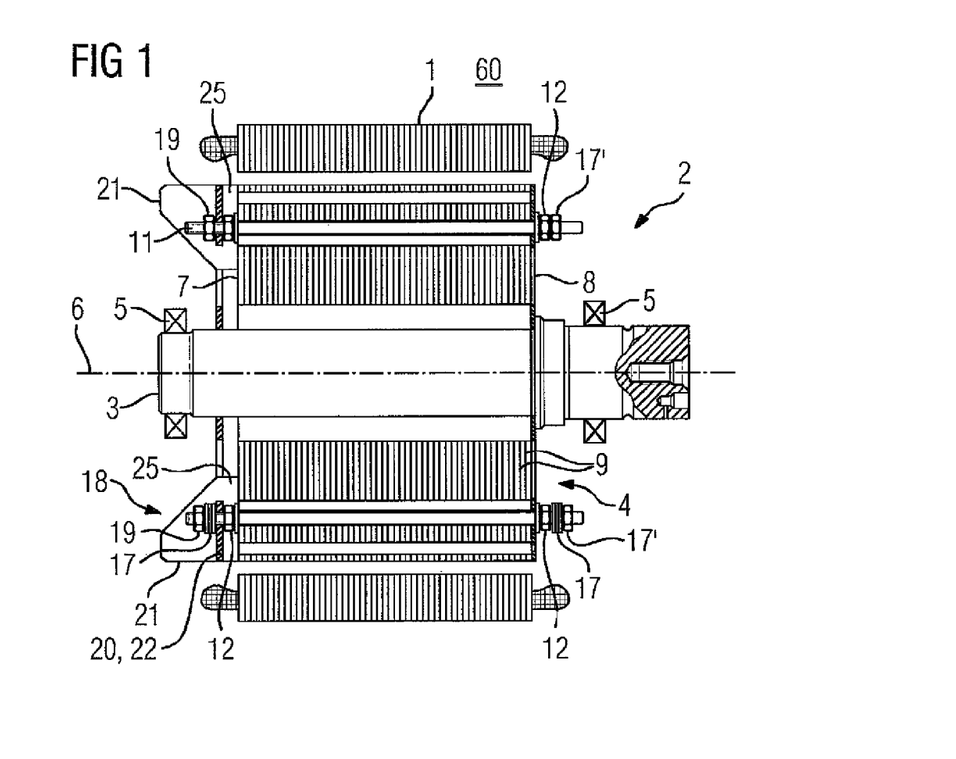
FIG. 1 a longitudinal section of an electrical machine.

The diagram according to FIG. 1 shows an electrical machine 60 with a stator 1 and a rotor 2. The rotor 2 has a rotor shaft 3 and a laminated rotor core 4. The rotor shaft 3 is mounted in bearings 5 so that the rotor shaft 3, and with it the entire rotor 2, can be rotated around a rotational axis 6 of the electrical machine.

Insofar as the terms "axial", "radial" and "tangential" are used, they relate to the rotational axis 6. The term "axial" means a direction parallel to the rotational axis 6. The term "radial" means a direction orthogonal to the rotational axis 6 towards or away from the rotational axis 6. The term "tangential" means a direction orthogonal to the rotational axis 6 and orthogonal to the radial direction, in other words, at a constant radial distance from the rotational axis 6 in a circle around the rotational axis 6.

As a rule, in accordance with the diagram of FIG. 1 the rotor 2 is arranged radially inside the stator 1. The electrical machine is therefore designed as an internal rotor. In individual cases, however, the rotor 2 can alternatively be arranged radially outside the stator 2. In this case, the electrical machine is designed as an external rotor.

According to FIG. 1, the laminated rotor core 4 extends in an axial direction viewed from a first axial end face 7 of the laminated rotor core 4 to a second axial end face 8 of the laminated rotor core 4. The laminated rotor core 4 has a multiplicity of rotor cores 9 which are stacked on top of each other in an axial direction.

Figure 2:
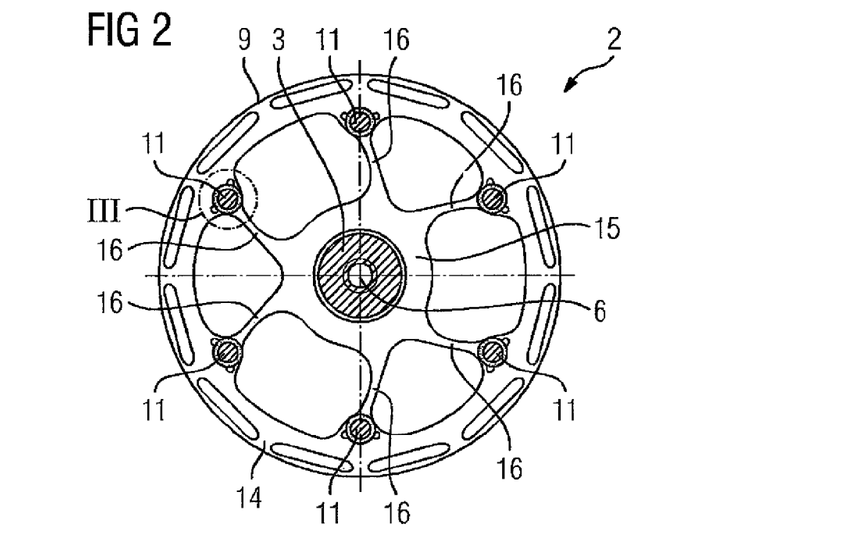
FIG. 2 a cross section of a rotor core.

According to FIGS. 1 and 2, apart from recesses for e.g. cooling channels, the laminated rotor core 4 has further recesses 10. According to FIG. 2, the further recesses 10 are distributed around the rotational axis 6. The further recesses 10 extend in an axial direction continuously through the laminated rotor core 4, in other words, from the first axial end face 7 to the second axial end face 8. A tension rod 11 is inserted into each of the further recesses 10. The tension rods 11 are longer than the laminated rotor core 4.

The tension rods 11 therefore extend axially beyond the end faces 7, 8 of the laminated rotor core 4. The further According to FIG. 1, a fan 18 is mounted at the first axial end face 7 of the laminated rotor core 4 on the tension rod 11. According to the diagram in FIG. 1, in particular the fan 18 can be mounted on the fastening element 12 located at the first axial end face 7. In this case the fastening elements 12 are arranged between the first end face 7 and the fan 18. The fan 18 can be attached to the tension rods 11 in particular by means of further fastening elements 19, for example, by means of nuts 19.

FIG. 2 shows a possible embodiment of the rotor cores 9. In particular, according to FIG. 2 the rotor cores 9 each have a yoke 14 on their side facing away from the rotational axis 6 and a sheet metal hub 15 on their side facing the rotational axis 6. The yokes 14 and the sheet metal hubs 15 of the rotor core 9 are connected to each other via respective sheet metal spokes 16. The use of the adjunct "sheet metal" in the designation of the sheet metal hubs 15 and the sheet metal spokes 16 serves to linguistically distinguish the aforementioned elements from other hubs and spokes. The adjunct "sheet metal" does not have a more detailed meaning in this connection.

The fan 18 can be designed as required. According to FIGS. 1 and 3, the fan preferably has an annular disk 20 as a supporting element and fan blades 21. The annular disk 20 is orthogonal to the rotational axis 6. The fan blades 21 protrude from the annular disk 20. In particular, they can protrude orthogonally from the annular disk 20.

It is possible that the annular disk 20 is identical to an outer ring 22. The outer ring 22 is essentially arranged at the same radial distance as the yokes 14 of the rotor core 9. The fan blades 21 are arranged on the outer ring 22. According to FIG. 3, however, in addition to the outer ring 22 the annular disk 20 also has a disk hub 23. In this case, the outer ring 22 is arranged on the side facing away from the rotational axis 6 of the annular disk 20, the disk hub 23 on the side facing the rotational axis 6 of the annular disk 20. The outer ring 22 and the disk hub 23 are connected to each other via disk spokes 24. The use of the adjunct "disk" in the designation of the disk hub 23 and the disk spokes 24 serves to linguistically distinguish the aforementioned elements from other hubs and spokes. The adjunct "disk" does not have a more detailed meaning in this connection.

Figure 3:
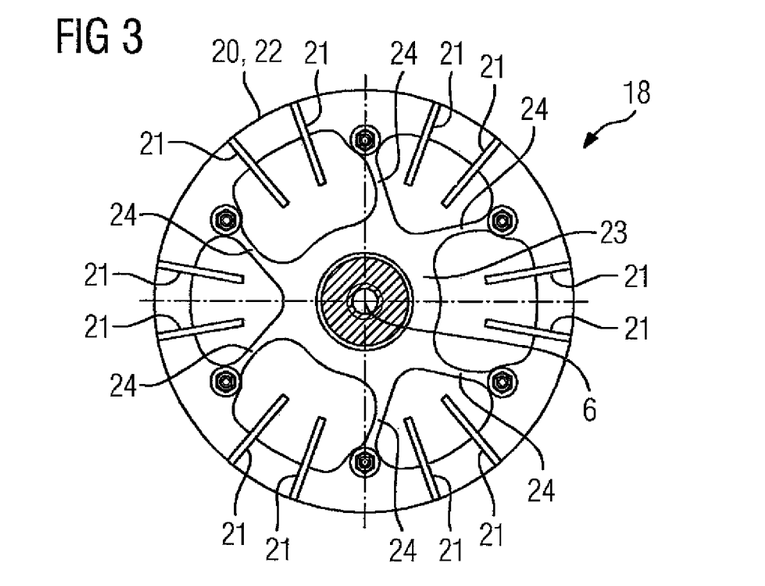
FIG. 3 a fan of the electrical machine of FIG. 1 viewed transversely to a rotational axis.

If the annular disk 20 comprises the outer ring 22, the disk hub 23 and the disk spokes 24, the contour of the annular disk 20 preferably corresponds to that of a rotor core 9.

The disk hub 23 can be connected to the rotor shaft 3 in a torque-proof manner. Preferably, however, the annular disk 20 is dimensioned such that the disk hub 23 is not connected to the rotor shaft 3 in a torque-proof manner. The disk hub 23 therefore serves solely as a positioning and centering aid for the installation of the fan 18.

In an embodiment the fan blades 21 are designed as sheet metal parts. The annular disk 20 can also be designed as a sheet metal part. The fan blades 21 can, for example, be mounted on the annular disk 20. The fan blades 21 are preferably mounted radially from the inside to the outside on the annular disk 20.

The fan blades 21 can be connected to the annular disk 20 in any manner. The fan blades 21 are preferably welded to the annular disk 20.

According to FIG. 1, the fan blades 21 have axial inner sections 25 and axial outer sections. An axial outer section is also called the first section, the axial inner section also being called the second section. According to FIG. 1 the axial inner sections 25 of the fan blade 21 are arranged between the annular disk 20 and the first axial end face 7. The axial height of the axial inner sections 25 is preferably measured in such a way that the axial inner sections 25 fit closely against the first axial end face 7 under compressive strength. The distance of the annular disk 20 or the outer ring 22 from the first axial end face 7 therefore exhibits a slight waviness in a circumferential direction viewed around the rotational axis 6, wherein the minima are found in the area of the tension rods 11 and the maxima in the area of the fan blades 21.

According to FIG. 1 in order to remove an imbalance on at least one of the tension rods 11, (at least) one balancing weight 17 can be attached.

Figure 4:
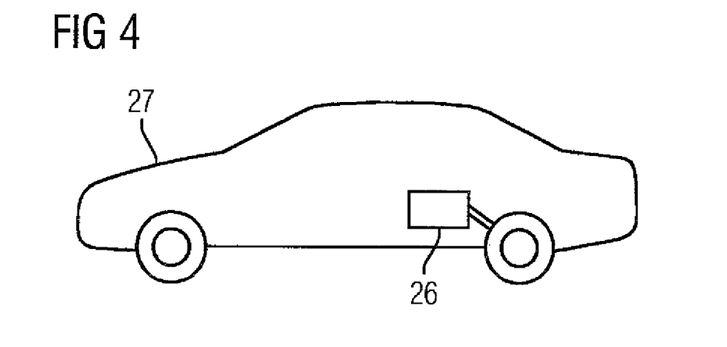
FIG. 4 a vehicle with an electrical machine.

In principle, an electrical machine according to the invention can be used for any purpose. The electrical machine according to FIG. 4 is preferably used as a traction motor 26 of a vehicle 27. The vehicle 27 can, for example, be designed as a railroad vehicle or as a road vehicle.

The electrical machine according to FIG. 1 shows that the fan blade 21 can support the laminated rotor core 4. Vibration dampening can also be achieved by means of the fan blades 21.

Figure 5:
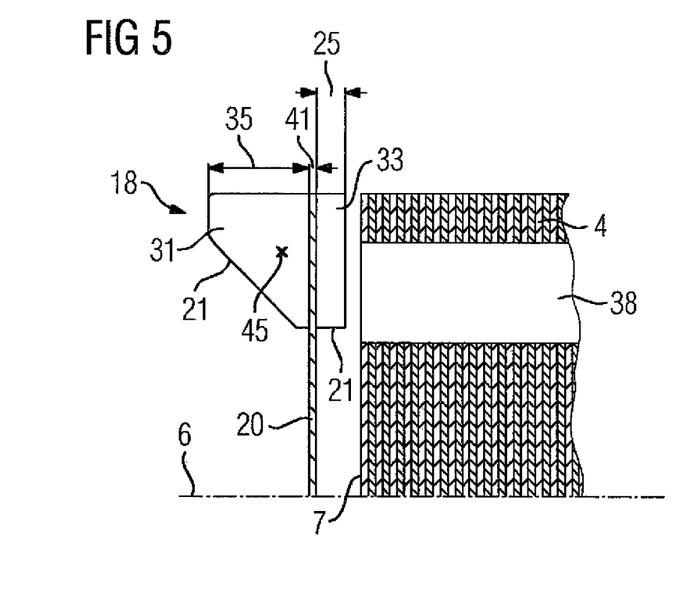
FIG. 5 an embodiment of a fan blade.

The diagram according to FIG. 5 shows a section of one embodiment of a fan 18 connected to the rotor of an electrical machine. A laminated rotor core 4 with a cooling channel 38 is shown in a sectional view. Further, a part of a fan 18 with a fan blade 21 is shown. The fan blade is supported by a supporting element 20 which can be rotated around a rotational axis 6. The fan blade 21 has a first section 31 in an axial outer section 35 and a second section 33 in an axial inner section 25. The second section 33 is facing the end face 7. The mass distribution of the fan blade 21 results in a center of gravity 45 of the mass as shown. The closer the center of gravity 45 moves to an area 41, the smaller the stress of a connection between the fan blade 21 and the annular disk 20. In the following figures variants of an embodiment of the fan 18 are shown. The same reference characters are used for similar parts.

Figure 6:
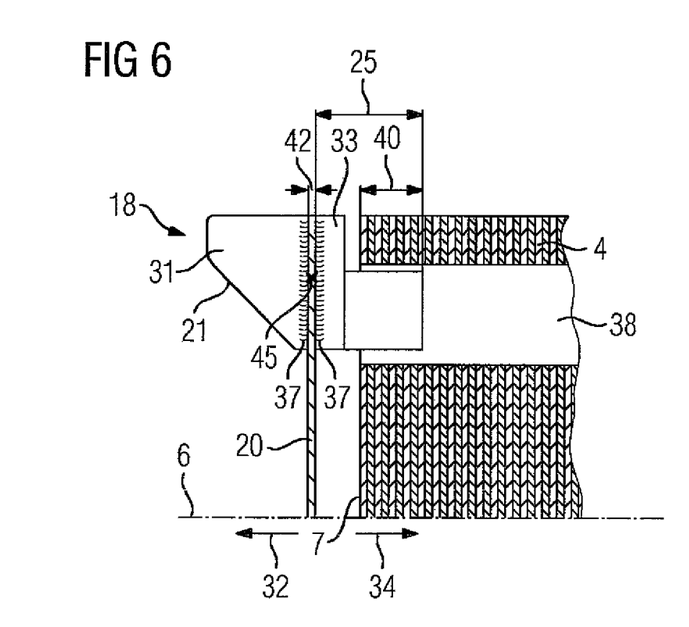
FIG. 6 a further embodiment of a fan blade.

The diagram according to FIG. 6 shows a fan blade 21 which is attached to the supporting element 20 by means of welded seams 37. The first section 31, aligned in a first axial direction 32, has a welded connection and the second section 33, aligned in a second axial direction, also has a welded connection. The second section 33 with the axial inner section 25 extends into the cooling channel 38. The cooling channel 38 and the second section 33 of the fan blade 21 therefore overlap axially in an extension section 40. As a result of the second section 33 extending into the cooling channel 38, compared to FIG. 5 the center of gravity 45 shifts to the end face 7 of the laminated rotor core 4. The center of gravity 45 is thus located in the disk section area 42, resulting in the welded seams being less stressed during operation of the electrical machine than in the case of FIG. 5.

Figure 7:
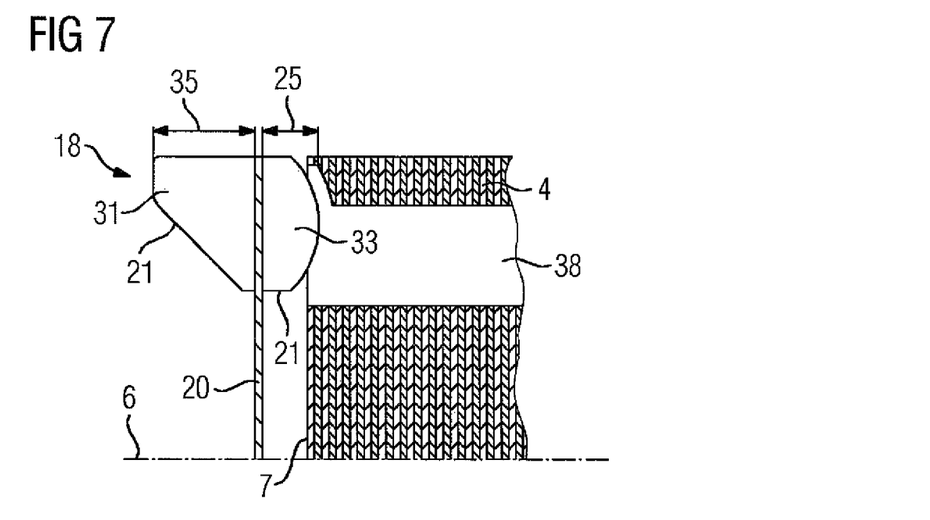
FIG. 7 a further embodiment of a fan blade.

The diagram according to FIG. 7 shows that the recess 38 can also extend in the end portion of the laminated rotor core 4 and the second section 33 extends there. The recess 38 into which the second section extends is not necessarily a cooling channel. The recess may also not have a passage from one end face to the other end face of the laminated rotor core.

Figure 8:
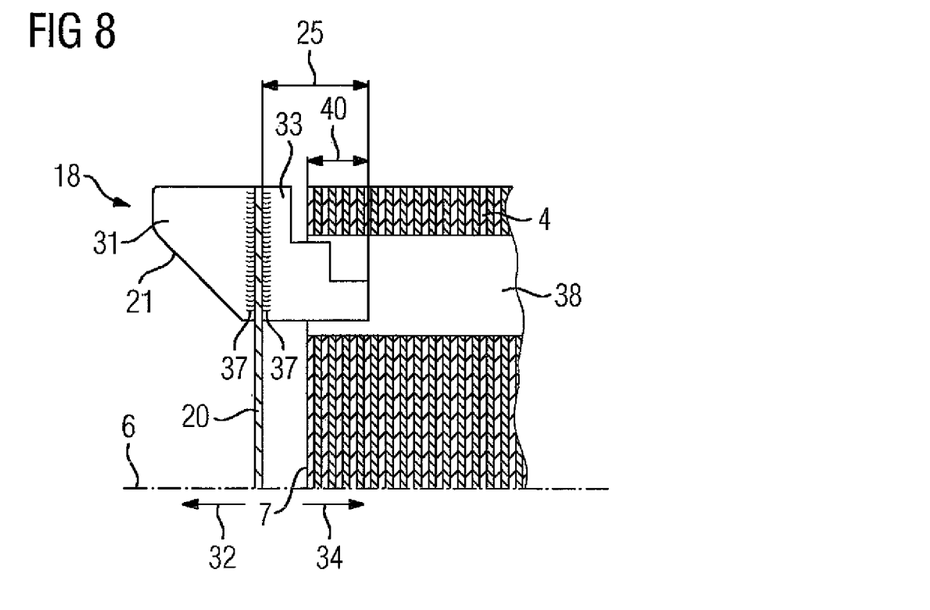
FIG. 8 a further embodiment of a fan blade.

The diagram according to FIG. 8 shows a graduated embodiment of the second section 33 protruding into the cooling channel 38. A shift in the center of gravity to the axis 6 can thus be achieved.

Figure 9:
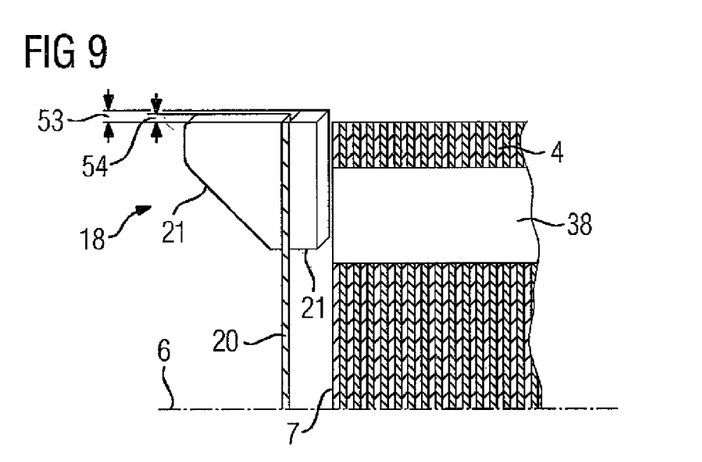
FIG. 9 a further embodiment of a fan blade.

The diagram according to FIG. 9 shows that the first section 31 has a thickness 54 and the second section a thickness 53, which is different from the thickness 54. As the thickness 53 is greater than the thickness 54, the center of gravity is also altered in comparison with similar thicknesses.

Figure 10:
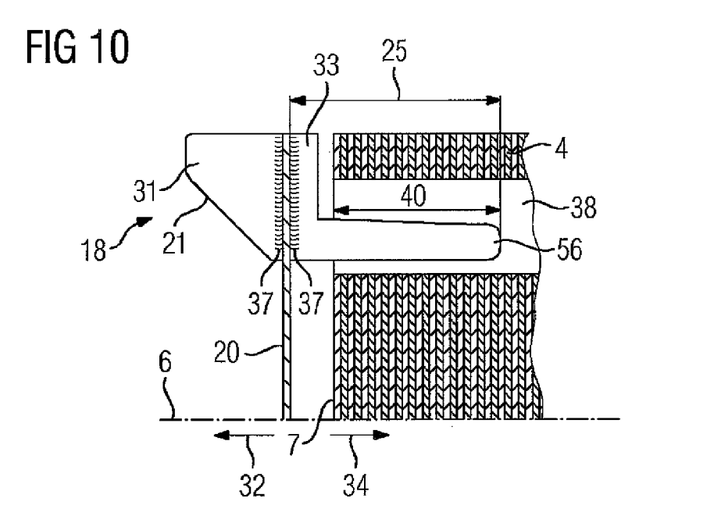
FIG. 10 a further embodiment of a fan blade.

The diagram according to FIG. 10 shows a second section 33 which has a section of the extension 40 which is longer than the radial cross section of the recess 38. The second section 33 has an end portion 56 which is rounded off. The radius or the various radii of the curvature are at the level at which the second section 33 extends into the recess.

Figure 11:
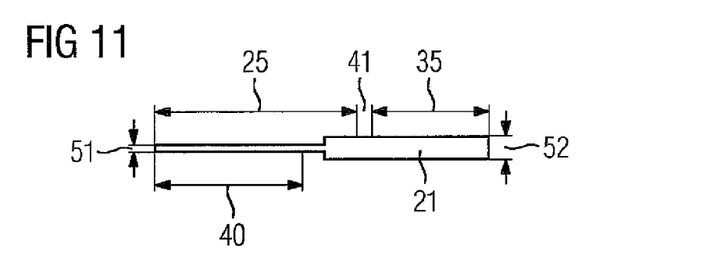
FIG. 11 a further embodiment of a fan blade.

The diagram according to FIG. 11 is a top view of a fan blade 21 to show the thickness ratios. As in the preceding figures, the fan blade has an axial inner section 25 and an axial outer section between which the disk section 41 is located. In a section 40 in which the blade 21 extends into a recess, the thickness 51 is less than, for example, in the axial outer section, the thickness 52 of which is comparatively greater.

Although the invention was illustrated and described in more detail by the preferred exemplary embodiment, the invention is not limited by the disclosed examples and other variations may be derived therefrom by an expert without departing from the scope of the invention.

What is claimed is:

1. A rotor of an electrical machine, said rotor comprising:
a laminated rotor core; and
a fan arranged at an end face of the laminated rotor core, said fan having a fan blade and a supporting element for support of the fan blade, said fan blade having a first section sized to extend beyond the supporting element in a first axial direction and a second section sized to extend beyond the supporting element in a second axial direction which is opposite the first axial direction,
wherein the supporting element is joined to the fan blade by a welded connection or bonded connection, and
wherein the center of mass of the fan blade is located in a central area of the bonded connection or welded connection, with the bonded connection or welded connection having a radial orientation.

2. The rotor of claim 1, wherein the first section has a first mass and the second section has a second mass, said first and second masses establishing a center of mass of the fan blade which center of mass is located in an area of the supporting element.

3. The rotor of claim 1, wherein the supporting element is an annular disk.

4. The rotor of claim 1, wherein the fan blades are designed as sheet metal parts and attached to the supporting element.

5. The rotor of claim 1, wherein the second section has a thickness which is smaller than a thickness of the first section.

6. An electrical machine, comprising:
a stator;
a rotor interacting with the stator and including a laminated rotor core, and
a fan arranged at an end face of the laminated rotor core, said fan having a fan blade and a supporting element for support of the fan blade, said fan blade having a first section sized to extend beyond the supporting element in a first axial direction and a second section sized to extend beyond the supporting element in a second axial direction which is opposite the first axial direction,
wherein the electrical machine is a traction motor of a vehicle,
wherein the supporting element is joined to the fan blade by a welded connection or bonded connection, and
wherein the center of mass of the fan blade is located in a central area of the bonded connection or welded connection, with the bonded connection or welded connection having a radial orientation.

* * * * *